Figure 1:
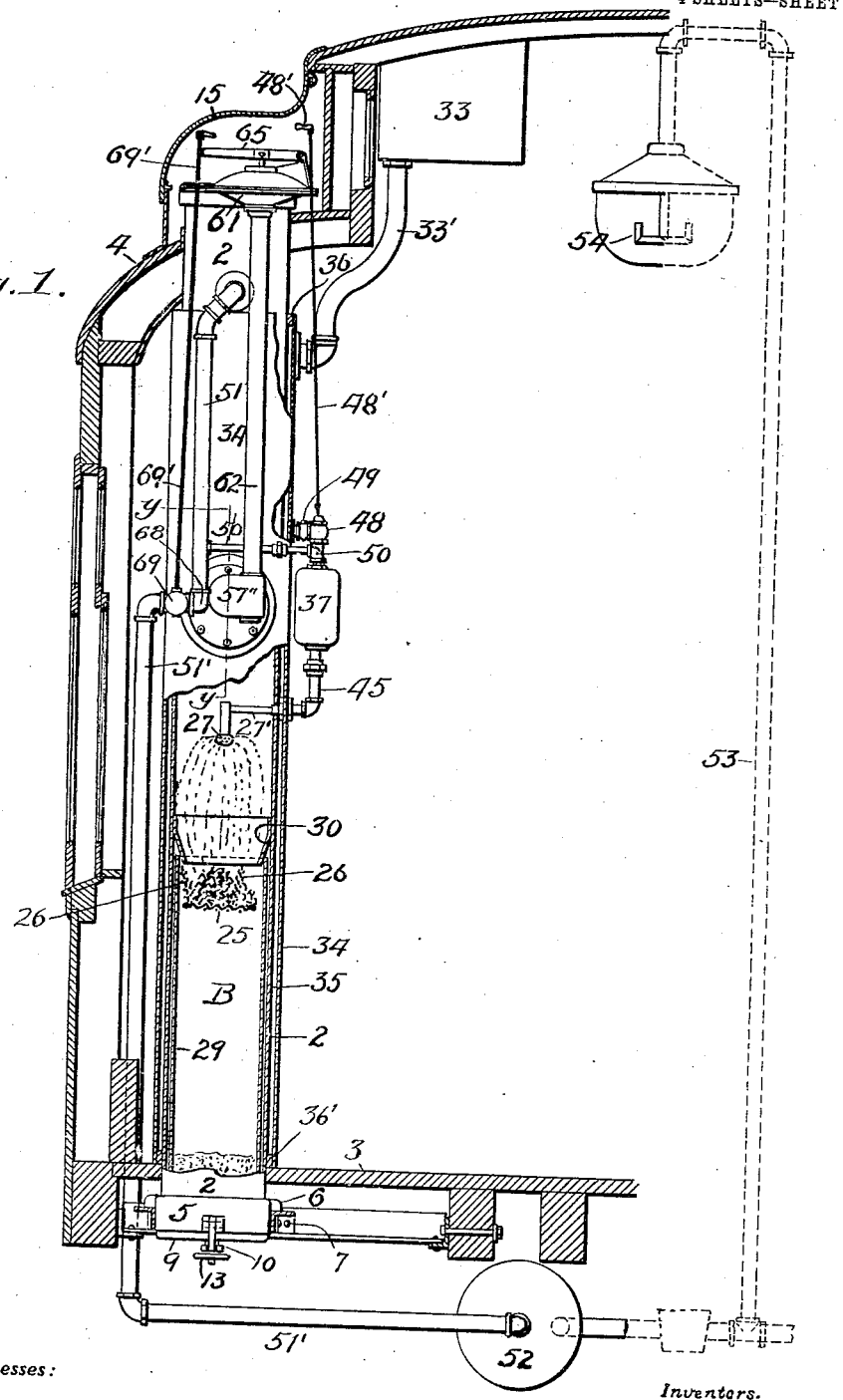

G. H. EMERSON, R. D. HAWKINS & F. T. KITCHEN.
ACETYLENE GAS GENERATOR.
APPLICATION FILED APR. 17, 1905.

932,006.

Patented Aug. 24, 1909.

4 SHEETS—SHEET 1.

Witnesses:

Inventors:
George H. Emerson
Robert D. Hawkins
Frederick T. Kitchen

By

Attorney

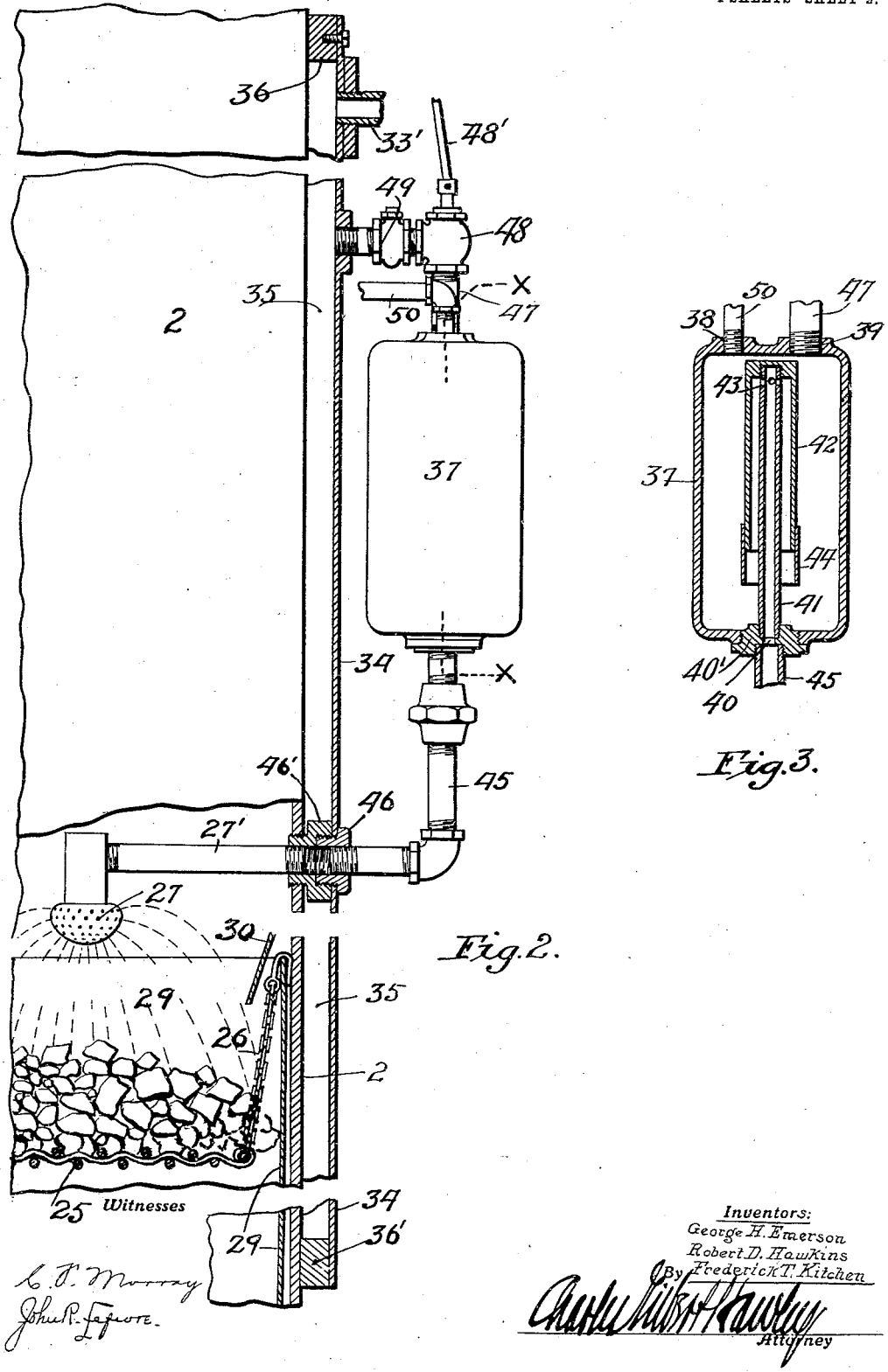

G. H. EMERSON, R. D. HAWKINS & F. T. KITCHEN.
ACETYLENE GAS GENERATOR.
APPLICATION FILED APR. 17, 1905.
932,006.
Patented Aug. 24, 1909.
4 SHEETS—SHEET 3.
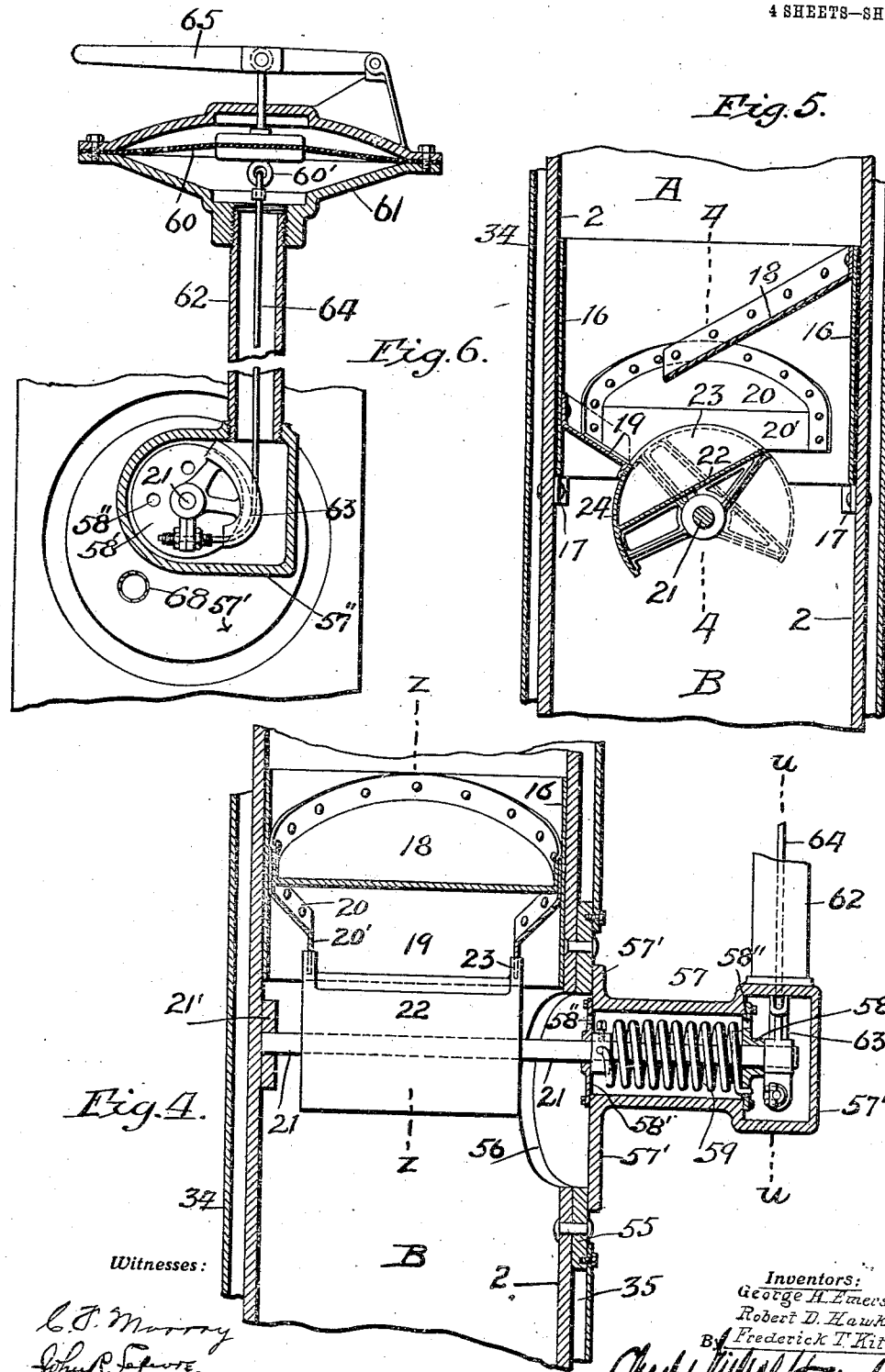
Witnesses:
C. J. Murray
John R. Lafure
Inventors:
George H. Emerson
Robert D. Hawkins
Frederick T. Kitchen
By Chas. Witter Hawley
Attorney G. H. EMERSON, R. D. HAWKINS & F. T. KITCHEN.
ACETYLENE GAS GENERATOR.
APPLICATION FILED APR. 17, 1905.

932,006.

Patented Aug. 24, 1909.
4 SHEETS—SHEET 4.

Witnesses:
C. F. Murray
John R. Lepore

Inventors:
George H. Emerson
Robert D. Hawkins
Frederick T. Kitchen
By Charles Wilbert Hawley
Attorney

UNITED STATES PATENT OFFICE.

GEORGE H. EMERSON, ROBERT D. HAWKINS, AND FREDERICK T. KITCHEN, OF ST. PAUL, MINNESOTA, ASSIGNORS TO GOLD CAR HEATING & LIGHTING COMPANY, OF NEW YORK, N. Y., A CORPORATION OF NEW YORK.

ACETYLENE-GAS GENERATOR.

932,006.        Specification of Letters Patent.      Patented Aug. 24, 1909.

Application filed April 17, 1905. Serial No. 256,089.

*To all whom it may concern:*

Be it known that we, GEORGE H. EMERSON, ROBERT D. HAWKINS, and FREDERICK T. KITCHEN, citizens of the United States, and residents of St. Paul, Ramsey county, Minnesota, have invented a new, useful, and Improved Acetylene-Gas Generator, of which the following is a full, clear, and exact description, such as will enable others skilled in the art to which it appertains to make and use the same.

This invention relates to improvements in means for safely and economically generating acetylene gas from calcium carbid, and has particular reference to improvements in acetylene gas generators with special bearing upon the equipment of railway cars.

The primary object of our invention is to provide an acetylene gas generator whereby acetylene gas may be rapidly, safely and automatically generated in desired quantities and at desired times.

A further object of the invention is to provide a gas generator that shall be of simple and durable construction and so arranged that it may be safely and quickly charged and emptied.

Another object of the invention is to provide a gas generator for and upon railway cars and to so arrange and construct said generator that it may be charged and emptied from the exterior of the car, to the end that all danger of flooding the car with gas shall be avoided; and for the further purpose of lessening the cost of attendance upon the generator.

Still another object of the invention is to construct and provide a gas generator for railway cars, which shall be small, compact and of neat appearance; and a particular object is to provide a gas generator of great strength and so located within and combined with the framing of the car that it shall be practically impossible for the same to become a source of danger even though the car be wrecked.

Other objects of the invention will appear hereinafter.

We attain these objects by the employment of, and our invention consists in, a gas generator of the construction and combination of parts, hereinafter described and particularly pointed out in the claims.

Our invention will be more readily understood by reference to the accompanying drawings, forming a part of this specification, and in which—

Figure 7:
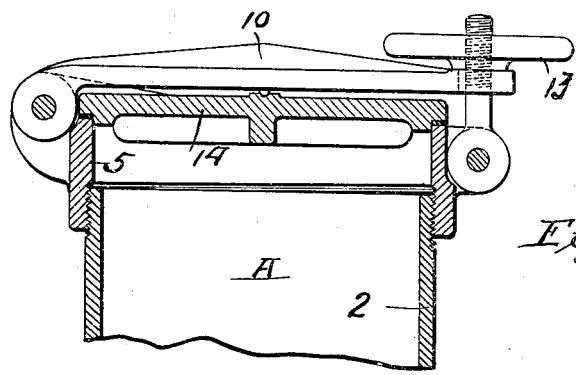
Figure 11:
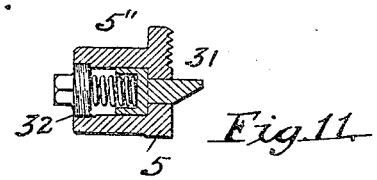
Figure 8:
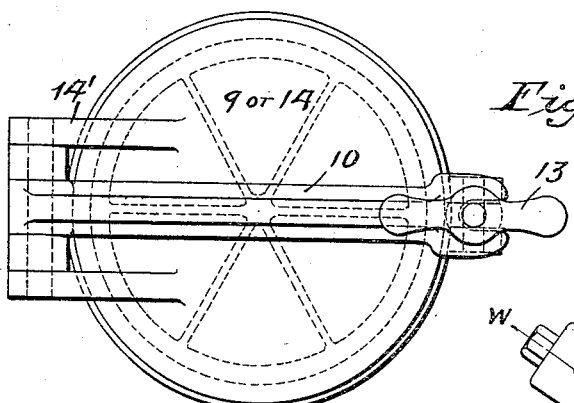
Figure 10:
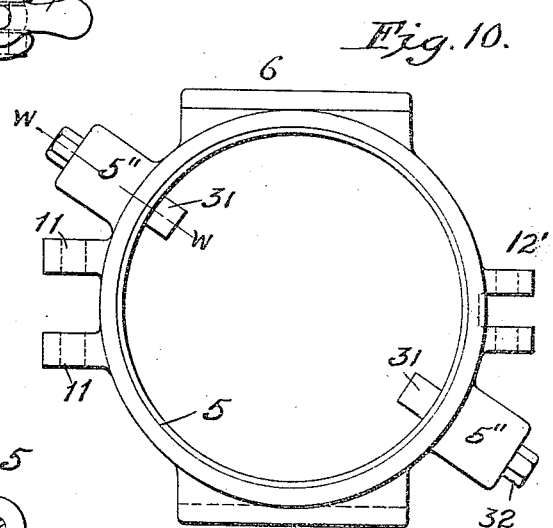
Figure 9:
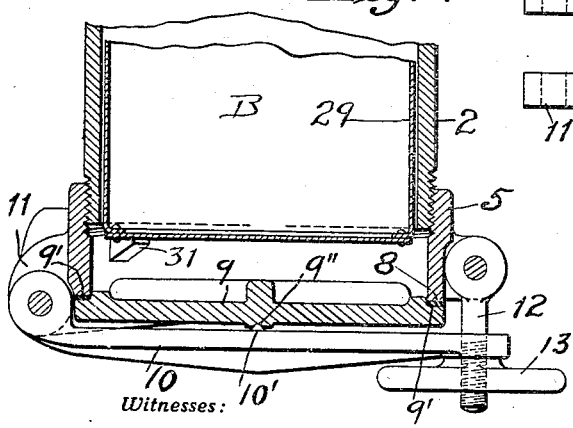

Figure 1 is a vertical, transverse section of a railway car or coach, equipped with a gas generator embodying our invention; Fig. 2 is an enlarged sectional view of the middle portion of the generator, showing the manner of supporting and wetting a quantity of carbid; Fig. 3 is a detail sectional view of the water measuring and feeding device, on the line $x$—$x$ of Fig. 2; Fig. 4 is an enlarged sectional view of the middle portion of the generator, taken on the line $y$—$y$ of Fig. 1, and showing the carbid-feeding mechanism; Fig. 5 is a sectional detail, on the line $z$—$z$ of Fig. 4; Fig. 6 is a sectional detail on the line $u$—$u$ of Fig. 4, the vertical section being continued through the regulating and operating diaphragm that is adjacent to the upper end of the generator (see Fig. 1); Fig. 7 is a vertical section of the upper end of the generator, showing the closure therefor; Fig. 8 is a plan view thereof; Fig. 9 is a vertical section of the lower end of the generator, showing the closure and also the means for supporting the residue can; Fig. 10 is a plan view of the lower casting of the generator, to be read in connection with Fig. 9; and Fig. 11 is a sectional detail of one of the residue can latches on the line $w$—$w$ of Fig. 10.

Before proceeding with the description of our acetylene gas generator as applied to railway coaches, we deem it proper to state that our generator is applicable to other uses, particularly to the furnishing of gas for the lighting of stores and residences. As such uses and also numerous modifications of our invention will readily suggest themselves to one skilled in the art, we do not confine our invention to the specific constructions, arrangement and use herein shown and described. Nevertheless, we consider our invention to be of most importance and greatest utility in the lighting of railway coaches and trains, including locomotives; and desire to direct particular attention to the advantages offered in that connection.

Referring now to the drawings, our generator, in its preferred form, is a long, tubular structure, placed at the side or in a corner of the car, with its ends protruding through the floor and the roof of the car.

Closures are provided for both ends of the structure at points outside of the car, these closures being of any suitable design, calculated to facilitate access to the interior of the generator and to tightly close the ends thereof. The upper part of the tubular body or structure is devoted to the reception of calcium carbid. The middle portion contains a carbid hopper and a feeding mechanism and it also contains a grating upon which a quantity of carbid is deposited by the feeder, and a sprayer through which the necessary water is supplied to decompose the measured quantity of carbid. The lower portion of the tubular body serves as a residue chamber to receive the slaked calcium carbid and surplus water. To these main elements of the generator are added several automatic regulating devices which control the feed or supply of carbid and water, and these, with the necessary gas pipes and conduits complete the gas generating system. The tubular structure alluded to preferably comprises a cylindrical tube or large pipe, 2, extending the full height of the car and projecting through the floor, 3, and the roof, 4, thereof. We usually employ a seamless steel tube of heavy gage, possessing sufficient strength to render it practically impossible to break the same by any blow to which it is subjected as in the case of the wrecking of the car. At the lower end of the tube is a circular casting, 5, screwed onto the end of the tube, 2, as shown in Fig. 9. This casting is provided with side lugs, 6—6, which rest upon the framing bars or beams, 7, in the car underframe, thus supporting the entire generator. The lower edge, 8, of the ring is turned smooth, the bottom closure of the generator comprises a disk, 9, carrying suitable packing, 9', and adapted to close against the lower edge, 8, of the ring. The disk, 9, is supported by the lever, 10, pivoted upon lugs, 11, on the ring, 5, and normally held up by a swivel screw, 12, having a hand wheel, 13, which engages the bifurcated end of the lever, 10. The screw, 12, is pivoted between lugs, 12', on ring, 5. To insure a tight joint, the lever, 10, is provided with a point or projection, 10', which enters a point socket, 9'', in the bottom of the disk, 9, the pressure being applied centrally thereon. The upper end of the generator is closed by a similar device arranged above the roof of the car. This upper closure comprises a ring screwed upon the tube, 2, a disk, 14, a lever and a hand screw, preferably identical with those of Fig. 9. In both cases, we provide the disk or closure proper with hinge lugs, 14', pivoted on the same pin with the lever, 10, to prevent the loss of the closures. The openings in the hinge lugs are larger than the pivot pin, leaving the disk free to be seated by the pressure of the fastening or lever. The top of the generator is usually protected by a housing, having a hinged top, 15, that may be thrown back over the car roof, to uncover the generator.

The bottom of the carbid compartment in the upper part of the tube, 2, is formed by a hopper, of the construction shown in Figs. 4 and 5. This hopper comprises a cylindrical sleeve, 16, which fits the tube and rests upon lugs, 17, on the inner walls thereof, taken together with the inclined bottoms, 18, 19 and 20—20, the latter terminating in vertical portions, 20'. A substantially rectangular carbid feed opening is thus formed at the bottom of the carbid space, A. This opening is in an operative sense closed by an oscillatory cut-off and feeding device that is arranged upon the cross shaft, 21. The feeder is a semi-cylindrical structure, comprising the plate, 22, the sides, 23, and the curved end or flange, 24. The normal position of the plate, 22, is as shown in Fig. 5. The sides, 23, work against the side flanges, 20', of the hopper, and the curved end, 24, of the feeder, makes a comparatively tight sliding joint with the lower end of the hopper bottom, 19. The whole device is preferably a metal casting, as indicated in the drawings, and is rigidly fastened upon the cross or rocking shaft, 21.

As positioned in Fig. 5, the feeder is ready to receive a charge of carbid from the hopper, and it will be obvious that when the feeder is rocked or oscillated to the position shown in dotted lines (Fig. 5), the charge of carbid resting upon the plate, 22, will be discharged, the curved end, 24, of the feeder meantime cutting off the fall or flow of carbid from the hopper. By this means we are able to supply regular measured quantities of carbid for decomposition in the lower part of the generator.

Neglecting for the moment the means employed for operating the carbid feeder, we will now describe the means for temporarily supporting a quantity of carbid that has been measured and discharged from the hopper. This means is of simple character, comprising a grating, 25, arranged in the generator tube or body beneath the carbid feeder. We prefer that the grating, 25, shall be circular and somewhat smaller than the generator tube so that it may vibrate therein, and the more readily discharge all slaked carbid. To permit its free vibration, the grating is suspended by three cords or chains, 26, having their upper ends hooked over the top of the residue can, 29, to the end that the grating may be removed with the can as hereinafter described. Immediately above the grating, we arrange a sprayer, 27, through which water is sprayed or discharged onto the carbid upon the grating. The spray head, 27, may be of any suitable form, and is attached to a pipe, 27', which extends through the side of the generator, to receive water as hereinafter described. The space, B, beneath the grating and closed by the hinged bottom of the generator is intended to receive the decomposed or slaked calcium carbid, and to facilitate the removal of such residue, a residue can, 29, is placed in the lower end of the generator. A tapered ring, 30, within the tube, 2, overlaps the upper edge of the can, 29, when in position. If desired, the bottom of the residue can, 29, may be allowed to rest upon the bottom closure, 9; but we find it more convenient to support the same upon spring latches, 31, in the ring, 5, as shown in Figs. 9 and 10.

The latches are simple spring bolts, arranged within the housings, 5″, cast on the ring, 5, as shown in Figs. 10 and 11. The outer ends of the housings are closed by tight plugs, 32, to prevent leakage of gas. Both slaked and unslaked carbid and the surplus water falling from the flexible grating, will be received by the can, 29, and when it is desired to rid the generator of residue, it is only necessary to unfasten and drop the bottom closure, 9, and then press back the latches, 31, whereupon the can, 29, will drop down upon the track beneath the car. The full can may be thus quickly removed and replaced by an empty can and when the upper chamber, A, has been filled with carbid, so to speak, through the roof of the car, the car may proceed on its way, the delay occasioned by the emptying and recharging of the generator having been of negligible effect. The water is preferably supplied to our generator from an elevated tank, 33, at the top of the car, and which may be filled through the roof of the car. The generation of acetylene gas is attended by considerable heat; and to cool the gas within the generator and avoid the annoyance consequent upon the presence in the car of a hot tube of these dimensions, we prefer to insulate the outer surface of the generator. This we accomplish by means of another metal tube, jacket or casing, 34, the same being of greater diameter than the tube, 2, so that an annular space, 35, remains between the two tubes. The tube or jacket, 34, is shorter than the tube, 2, and the annular space, 35, is closed at top and bottom by means of rings, 36—36′. The pipe, 33′, leading from the water tank, 33, is connected with the top of the space, 35, and said space is therefore always filled with water, forming a part of the water reservoir of the generator.

The wall of water surrounding the generator, effectively prevents the radiation of heat therefrom to any annoying extent, and what is more important, maintains a low temperature within the generator. The manner of supplying water to the carbid sprayer will be best understood by reference to Figs. 1, 2 and 3, when it will be seen that the water is conducted through a by-pass, which connects the upper portion of the water space, 35, with the sprayer pipe, 27′. A portion of the by-pass is comprised of the water-measuring device which is adapted to intermittently supply definite quantities of water to the sprayer. The measuring device is a closed cylinder or chamber, 37, arranged at the side of the generator and having two openings, 38—39 in its top, and a single opening, 40, in its bottom. Within the cylinder, 37, is a standpipe, 41, having its lower end screwed into the plug, 40′. This standpipe carries a bell or tube, 42, closed at the top and open at the bottom. Communication between the tubes 42 and 41 is established by openings, 43, at the top of tube, 41, and the device operates as a siphon.

44 is an adjustable sleeve on the lower end of the bell, 42, for regulating the length of the bell, 42, to nicely determine the quantity of water that will be delivered from the cylinder, in the manner hereinafter explained. The lower end of tube, 41, is connected with the sprayer pipe, 27′, by a pipe, 45, suitable threaded sleeves, 46, 46′, being employed in the walls of the generator. There is no direct connection between the interior of the cylinder, 37, and the sprayer except through the passage afforded by the siphon. The water enters the cylinder through a pipe, 47, containing a shut-off valve, 48, and a check valve, 49, and connected with the water space, 35. The check valve operates inwardly to close the passage when there is an excess of gas in the cylinder, 37. As intimated, the cylinder, 37, is connected with the body of the generator by pipes, 50 and 51, the latter being the main gas outlet of the generator, and containing a valve, 69, by which the flow of gas may be shut off. We may connect the gaspipe, 51, to the generator at a point above the water jacket, as shown in Fig. 1, and said pipe or a connected pipe 51′ extends from thence downward through the floor of the car to a freezing tank, 52, in which the gas is rid of moisture.

53 represents a burner supply pipe and 54 a gas lamp within the car.

Returning now to the carbid feeding mechanism, with direct reference to Figs. 1, 4, 5 and 6 of the drawings, it will be seen that at a point adjacent to the carbid feeder, the generator tube is provided with a saddle plate, 55, and an opening, 56, through which the feeder may be inserted. This opening is closed by the flange, 57′, of the hollow arm, 57, having an enlarged hollow portion or head, 57″, at its outer end. The shaft, 21, has a bearing, 21′, on the wall of the generator and other bearings, 58—58′, in the arm, 57. The circular webs of the bearings, 58—

58', are provided with gas holes 58'', but otherwise form a closed spring chamber within the arm, 57. Within this is a coil spring, 59, having one end attached to the shaft, 21, and the other to the bearing, 58. When the parts are assembled, the spring is turned to place it under such tension that it will have a tendency to hold the feeder in its opened position. In other words, the tendency of the spring is to turn the feeder and discharge the carbid resting thereon, upon the grating. This tendency of the spring is opposed by a diaphragm, 60, the casing, 61, of which, is, for safety, placed above the roof of the car, and connected with the interior of the generator by a standpipe, 62, having its lower end screwed into the top of the hollow arm, 57. The outer end of the shaft, 21, carries a quadrant or segment, 63, and a cord or cable, 64, extends from this to a fastening, 60', on the diaphragm, 60. An accumulation of gas pressure within the generator will be communicated through the arm, 57, and pipe, 62, and if sufficiently powerful to overcome the strength of the spring, 59, will elevate the diaphragm, 60, against the atmospheric pressure upon the top thereof, thereby causing the return or reverse rotation of the quadrant, 63, and the feeder, 22, to close the bottom of the carbid hopper or compartment, A. We prefer to form the quadrant, 63, as a portion of an oval or ellipse, so that the diaphragm may exert its greatest leverage to hold the feeder closed. A lever, 65, is mounted above the diaphragm. The lever is used for starting the generator, the operation being to forcibly elevate and depress the diaphragm, through the medium of the lever, one or more times as required, to deposit a quantity of carbid upon the generator grating. As shown in Figs. 1 and 6, we usually provide the generator with a second gas connection to the pipe, 51, same being a short pipe, 68, and extending from the plate or flange, 57, on the side of the generator. As shown in Fig. 1, the valve rods, 48' and 69', are extended through the roof and provided with suitable handles so that the valves can be operated only from the exterior of the car. The control of the generator is thus put beyond the province of the trainmen.

From the following description of the operation of our invention, it will be understood that the automatic carbid feeding mechanism and the water feeding mechanism are interdependent and constitute a combined, automatic controlling mechanism, by which the generation of gas may be reliably regulated.

Assuming that the generator is empty and is about to be put into service; at such time, the valves, 48, and 69, the only ones, will be closed. The man whose duty it is to charge the generator, will ascend to the roof of the car, and, opening the upper end of the generator, will place a quantity of carbid in the carbid chamber, A, thereof, afterward carefully replacing the cover or closure. At the same time, the water tank, 33, will be filled and the diaphragm lever operated to dump a quantity of carbid, after which the generator is ready for service. As there is no pressure of gas within the generator at this time, the diaphragm will fall when the lever, 65, is released, and freeing the shaft, 21 will permit the spring, 59, or an equivalent weight, to rotate the feeder to the dotted line position of Fig. 5, and discharge the carbid previously deposited therein. When this has been accomplished, the attendant, still on the car roof, opens the water and gas valves. Immediately water will flow into the chamber, 37, and as soon as water, accumulating in the chamber, 37, rises to a level slightly above the openings, 43, at the top of the siphon, the siphon action will be instituted and substantially the whole body of water collected within the chamber, 37, will be siphoned out of said chamber and discharged upon the carbid on grating, 25, through the sprayer, 27, thereby initiating the generation of gas. Water will continue to be fed through the siphon until sufficient gas has accumulated to exert back pressure upon the check valve, 49, in the by-pass, the water passage being then closed by said check valve.

Pressure which is sufficient to close the check valve is almost sufficient to elevate the diaphragm in the manner explained, thereby restoring the carbid feeder to its closed or receiving position. The closing of the feeder follows the cutting off of the water, and the opening of the feeder precedes the next flow of water. The feeder will thus be automatically recharged with carbid in readiness to supply another measured quantity upon the grating as soon as the pressure within the generator falls below the strength of the feeder spring, 59. When this occurs, the charge of carbid will be dumped and at the same time, the check valve, 49, will be freed, so that the siphon will again begin to fill with water. The power of the spring, 59, the area of the diaphragm, 60, and the head of water in the tank are factors which enter into the control of the machine and which are determined in advance according to the required capacity of the machine. The volume of water which will be discharged from the siphon is determined by the dimensions of the cylinder, 37,—by the position of the adjustable sleeve, 44, on the siphon, and by the sensitiveness of the check valve, and these parts are preferably so proportioned that the operation of the siphon will continue several minutes and will supply water somewhat in excess of the theoretical quantity of water required for a measured quantity of carbid on the grating. At the end of the car run, or at any other convenient time—usually just previous to recharging the generator with carbid, the generator is emptied readily by the simple opening of the lower end of the generator and the removal of the residue can, after shutting of water and gas cocks.

We have found it possible and advantageous to use our generator to furnish gas for the several lamps upon locomotives, and in such cases, place the generator in the locomotive tender water tank, connecting the same with the pipes or conduits on the locomotive by a flexible hose. We also deem it proper to state that when our generator is used in residences, the diaphragm may be dispensed with and the carbid feeder operated from the movable bell of a gasometer.

Having thus described our invention, we claim as new, and desire to secure by Letters Patent:

1. A car, in combination with an acetylene gas generator body of uniform diameter throughout and of greater height than the body of the car and having its ends extending through the floor and the roof of said car, to discharge and receive material, and suitable closures clamped upon the ends of the generator, substantially as described.

2. A car, in combination with a gas generator body comprising an upright tube of uniform diameter throughout, said generator body having a bottom closure beneath the floor of the car for emptying the body of slaked carbid, and a closure or cover for the upper end of the body upon the exterior of the car, substantially as described.

3. A car, in combination with an acetylene gas generator having a body extending through both the floor and the roof of the car and provided with suitable top and bottom closures, which, when open, permit the generator to be charged and emptied from the exterior of the car, suitable carbid and water supplying means within the generator, and means upon the exterior of the car for regulating the operation of said means, substantially as described.

4. A structure, such as a car, in combination with a generator body arranged vertically in said car and provided with suitable closures below the car floor and above the car roof, a carbid feeding device dividing said body into an upper carbid holding compartment and a lower residue compartment, means upon the exterior of the car, in gas connection with said body and adapted to operate the carbid feeding device, and suitable means for supplying water to the lower part of said body, substantially as described.

5. A car, in combination with a generator arranged within said car, adapted to be filled and emptied only from the exterior of the car and having automatic carbid and water feeding means, the whole being of such construction that the operation of the generator is manually controllable only from the exterior of the car, substantially as described.

6. A structure, such as a car, in combination with an acetylene gas generator, comprising a body containing carbid and water feeding means and having its upper and lower ends projecting through the roof and the floor of the car respectively, suitable closures for the upper and lower ends of said body, a gas operated device adjacent to one of the ends of said body and exposed upon the exterior of the car, said device being adapted to operate said feeding means, and means upon the exterior of the car for arbitrarily actuating said gas operated device, there being also a suitable gas system within the car and connected to said generator, substantially as described.

7. A car, in combination with a generator body having its ends extended through the floor and roof of said car, closures for the ends of said body, a carbid feeding device within said body, a diaphragm located upon the exterior of the car and adapted to operate said feeding device, means upon the exterior of the car for operating said diaphragm at will, a valved gas outlet for said generator body, a water reservoir, a valved water passage connected therewith and discharging into said body, and means upon the exterior of the car for operating the gas and water valves, substantially as described.

8. A car, in combination with a tubular generator body of uniform diameter throughout having its ends projected through the floor and roof of said car, closures hinged upon the upper and lower ends of said body, closure-securing means also secured thereon, carbid feeding and spraying means within said body, a water reservoir, and an automatic gas pressure actuated diaphragm controlling the operation of said feeding and spraying means, substantially as described.

9. A car, in combination with a generator body comprising a large pipe having its ends projected through the floor and roof of said car, suitable end closing covers on the ends of said body, a closed water jacket surrounding said body within the car, and suitable automatic carbid and water feeding means in and upon said body, substantially as described.

10. A generator, comprising a large pipe or tube of uniform diameter, in combination with ring castings upon the ends of said pipe, end closing covers arranged on said ring castings, a tubular water jacket of less length than said tube and closed at its ends, a water reservoir supplying said jacket, and carbid and water feeding means provided within said pipe, the latter being supplied from said reservoir, substantially as described.

11. In an acetylene gas generator, a generator body containing carbid and residue compartments, in combination with a carbid measuring and feeding device interposed between said compartments, a grating below said device, a sprayer located within said body between said device and said grating to direct water upon the carbid as delivered by said device, gas pressure operated means for actuating said device, and gas pressure controlled means for intermittently supplying water to said sprayer, substantially as described.

12. In an acetylene gas generator, a generator body to contain carbid, in combination with a water sprayer located below the point of carbid delivery within the generator, and an intermittent gas-pressure-controlled water siphon connected with said sprayer, for supplying measured quantities of water thereto, substantially as described.

13. In an acetylene gas generator, a body containing a carbid receptacle, in combination with a water pipe entering said body, a siphon connected with said pipe, a siphon chamber, a water reservoir connected with said chamber and an automatic cut-off valve for interrupting the flow of water to said siphon chamber when the pressure of gas within said body becomes excessive, substantially as described.

14. In an acetylene gas generator, a generator body adapted to contain carbid in its upper part, a carbid measuring and feeding device provided in said body, a suitable grating provided in the body to receive the carbid discharged by said device, a sprayer arranged above said grating and beneath said feeding device, automatic means for actuating said feeding device and an automatic water siphon for measuring and supplying water to said sprayer, substantially as described.

15. In an acetylene gas generator, a generator body, in combination with a carbid measuring and feeding device in the upper part of said body, a suitable grating beneath said device to receive carbid therefrom, the lower part of said body providing space for the reception of slacked carbid, automatic means for actuating said device, a siphon chamber, a water reservoir connected with said chamber, a water cut-off valve between said chamber and said reservoir, a siphon within said chamber, a pipe leading therefrom to a point within the body above said grating, and a gas pipe or duct forming communication between the top of said siphon chamber and the upper part of the generator body, substantially as described.

16. In an acetylene gas generator, suitable means to contain carbid, in combination with a water reservoir and an intermittently operable water feeding siphon and siphon chamber interposed between said reservoir and the carbid container, substantially as described.

17. In an acetylene gas generator, a generator body to contain carbid, in combination with a water reservoir, a siphon chamber having its top in communication with said body and with said reservoir, a water cut-off or check valve interposed between said chamber and said reservoir, and a siphon arranged in said chamber for intermittently discharging water therefrom into said body, substantially as described.

18. In an acetylene gas generator, a generator body, in combination with an intermittent carbid measuring and feeding device arranged in the upper part of said body, a swinging grating arranged within the body below said feeder and intermittent water supplying means above said grating and beneath said device for discharging water upon said grating, substantially as described.

19. In an acetylene gas generator, a generator body, comprising a pipe or tube of substantially the same diameter throughout, in combination with means supporting said pipe or tube in an upright position, removable covers or closures fitting the ends of said pipe and making the same gas tight, a swinging grating midway of said pipe to support a body of carbid, flexible supports for said grating secured to the side of said pipes, whereby said grating will be automatically agitated by any movement of the pipe or tube, gas pressure controlled means for feeding water into said body arranged above said supports and a gas outlet pipe leading from the upper part of said body, substantially as described.

20. A car, in combination with a large pipe or tube of substantially the same diameter throughout, occupying a vertical position in said car and extending through the floor and roof thereof, removable covers or closures fitting the ends of said pipe outside the car, means dividing said pipe into an upper unslaked carbid receiving portion and a lower slaked carbid receiving portion, a water reservoir connected with said pipe or tube and a gas pipe leading from the upper part of said pipe or tube, substantially as described.

21. A closed gas generator body comprising a pipe or tube, having detachable covers at its ends and adapted to contain slaked and unslaked carbid, in combination with a water pipe leading into said tube, a siphon at the upper end of said water pipe, a siphon chamber inclosing said siphon, a water supply pipe connected with said chamber, a check valve therein, a gas pipe joining said chamber and the generator tube and a gas pipe leading from the upper part of the generator tube, substantially as described.

22. An acetylene gas generator in combination with a chamber for unslaked carbid, an inclined plate within said chamber, an oscillatory cutoff and feeder for receiving and discharging measured quantities of carbid from the chamber, a tubular extension communicating with said chamber adjacent said feeder, a diaphragm chamber at the terminus of said extension, means for admitting the generated gas to the diaphragm chamber, a diaphragm therein, connections between the diaphragm and the feeder, and means tending to hold said feeder in discharging position, said means being housed within said tubular extension; substantially as described.

23. In an acetylene gas generator, an inner shell and a spaced outer shell, forming an annular water space therebetween, means for filling said space with water, a siphon chamber without the shell, a pipe connecting the upper end of said chamber to said water space, a pipe connecting the lower end of said chamber to the interior of the inner shell, and a sprayer-head connection to the last named pipe; substantially as described.

24. In an acetylene gas generator, an inner gas-holding shell and an outer water-holding shell surrounding a portion of the gas-holding shell, a gas pipe connected to said inner shell, a siphon chamber, a gas connection from the gas pipe to the siphon chamber, a water connection from the outer shell to the siphon chamber, and a water-discharging connection from said chamber to the interior of the gas holding shell; substantially as described.

25. In an acetylene gas generator, a gas-pressure-controlled water-supply regulator comprising a closed chamber provided with water and gas inlets and a water outlet, a vertical tube connected to the water outlet, a bell mounted on said tube, and a water passage through the upper part of said tube within the bell; substantially as described.

26. In an acetylene gas generator, a gas-pressure controlled water-supply regulator comprising a chamber provided with water and gas inlets and a water outlet, a vertical tube rising from the water outlet within said chamber, and a bell mounted on said tube and provided with a length-adjusting portion; there being a water passage through the upper part of said tube into the bell; substantially as described.

27. In an acetylene gas generator, a generator body, comprising a pipe or tube of substantially the same diameter throughout, in combination with means supporting said pipe or tube in an upright position, removable covers or closures fitting the ends of said pipe and making the same gas tight, a residue can in said pipe, a swinging grating midway of said pipe to support a body of carbid, flexible supports for said grating secured to said residue can, gas pressure controlled means for feeding water into said body, and a gas outlet pipe leading from the upper part of said body, substantially as described.

In testimony whereof, we have hereunto set our hands, this 10th day of April, 1905, at St. Paul, Ramsey county, Minnesota, in the presence of two subscribing witnesses.

GEO. H. EMERSON.
ROBT. D. HAWKINS.
FREDERICK T. KITCHEN.

Witnesses:
 FILBERT L. GABRIS,
 R. M. ALDRED.